(12) United States Patent
Bang et al.

(10) Patent No.: US 6,628,107 B1
(45) Date of Patent: Sep. 30, 2003

(54) POWER MANAGEMENT FOR A PORTABLE ELECTRONIC DEVICE

(75) Inventors: William R. Bang, E. Farmindale, NY (US); Dean La Rosa, Bohemia, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/000,047

(22) Filed: Oct. 31, 2001

(51) Int. Cl.[7] .............................. G05F 1/40; H02M 1/12
(52) U.S. Cl. .......................................... 323/266; 363/49
(58) Field of Search .............................. 363/16, 49, 17, 363/50, 90, 39; 323/282, 266, 272, 268, 222; 307/125; 361/93, 111

(56) References Cited

U.S. PATENT DOCUMENTS

| | | | | |
|---|---|---|---|---|
| 5,233,287 A | * | 8/1993 | Lenk | 323/268 |
| 5,237,259 A | * | 8/1993 | Sanpei | 320/158 |
| 5,574,632 A | * | 11/1996 | Pansier | 363/49 |
| 5,631,503 A | | 5/1997 | Cioffi | |
| 6,094,036 A | * | 7/2000 | Rampold | 323/266 |
| 6,097,973 A | | 8/2000 | Rabe et al. | |
| 6,104,759 A | * | 8/2000 | Carkner et al. | 323/282 |
| 6,140,807 A | | 10/2000 | Vannatta et al. | |
| 6,153,949 A | * | 11/2000 | Soderhall | 307/125 |
| 6,225,708 B1 | | 5/2001 | Furukawa et al. | 307/66 |
| 6,362,979 B1 | * | 3/2002 | Gucyski | 363/17 |

* cited by examiner

*Primary Examiner*—Rajnikant B. Patel
(74) *Attorney, Agent, or Firm*—Amin & Turocy, LLP

(57) ABSTRACT

A system for a supplemental power source for a hand held portable electronic device is provided. A super capacitor is connected in parallel to a main battery of the portable electronic device. When the main battery becomes disconnected, the super capacitor is used to power the portable electronic device. The super capacitor is also used to provide compensation for the internal impedance of the main battery and the path impedance between the main battery and the load.

14 Claims, 6 Drawing Sheets

POWER MANAGEMENT FOR A PORTABLE ELECTRONIC DEVICE

FIELD OF THE INVENTION

The present invention generally relates to portable electronic devices. In particular, the present invention relates to a system and method for power management in a portable electronic device.

BACKGROUND OF THE INVENTION

Portable electronic devices (e.g, notebook computers, mobile data terminals, radio frequency portable communication devices, etc.) typically include a rechargeable or alkaline battery to supply power to the portable device. These devices also typically employ a secondary power source to ensure that data stored in a Random Access Memory (RAM) device is not lost in the event that the main battery becomes disconnected from the portable device. The main battery may become disconnected if the portable electronic device is dropped, or if the main battery is being swapped with a new main battery. The bridge battery is usually a smaller battery because during a battery swap, the portable device normally will enter a low current or suspend mode, so that most current drawn from the bridge battery is used to refresh the RAM device, until a new main battery is installed into the device.

Many portable devices employ complicated switching or logic circuitry when changing from the main battery power to the bridge battery power. The switching or logic circuitry takes up valuable space on a circuit board that could be utilized to perform the functions of the portable device. In some cases, additional circuit boards are necessary to house the switching or logic circuitry. Furthermore, some of these portable devices employ expensive power management and supervisory circuitry to cause the functional components in the portable device to enter different modes, depending on the type of unit powering the portable device or the current status of the unit powering the portable device. The additional power management and supervisory circuitry adds to the size, the cost and also to the complexity of the portable device.

Accordingly, there is a strong need in the art for a system and/or methods that can provide power distribution for a portable electronic device at low cost, while reducing space utilized in employing such a system.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a power management system for a portable electronic device. The power management system provides supplemental power to the portable electronic device in the event that the main battery becomes disconnected from the portable electronic device. Thus, in accordance with one aspect of the present invention, a power management system is provided for a portable electronic device that includes a battery and a super capacitor electrically connected to the battery. The super capacitor is employed to provide power to the portable electronic device power supply when the battery loses connection with battery contacts.

In accordance with another aspect of the present invention, a system is provided for compensating the internal impedance of a battery in a portable electronic device. When the internal impedance of a battery rises to a predetermined level, the low internal impedance of a super capacitor is employed to compensate for the battery's high internal impedance, thus preventing a voltage drop in the system.

In accordance with another aspect of the present invention, a system is provided in which a battery and a super capacitor share a load. The battery and the super capacitor are connected electrically in parallel and are able to drive a common load while distributing the demand placed on the battery and super capacitor in accordance with their respective capacity and power capabilities.

In accordance with yet another aspect of the present invention a method is provided for supplementing a power source for a portable electronic device. The method includes: providing a battery to the device, the battery being employed to power the device as long as the battery remains connected to the device, and providing a super capacitor to the device. The super capacitor is employed in the event that the battery becomes disconnected from the device and/or the ability of the battery to provide a suitable level of power to the device is diminished.

In accordance with yet another aspect of the present invention, a method is provided for compensating the internal impedance of a battery in a portable electronic device. The method includes, providing a battery to the device as a main power supply and providing a super capacitor electrically connected to the battery, the super capacitor being operable to balance the internal impedance of the battery. As the internal impedance of the battery rises, the low level of the internal impedance in the super capacitor balances out the high internal impedance of the battery to prevent a voltage drop out in the system.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
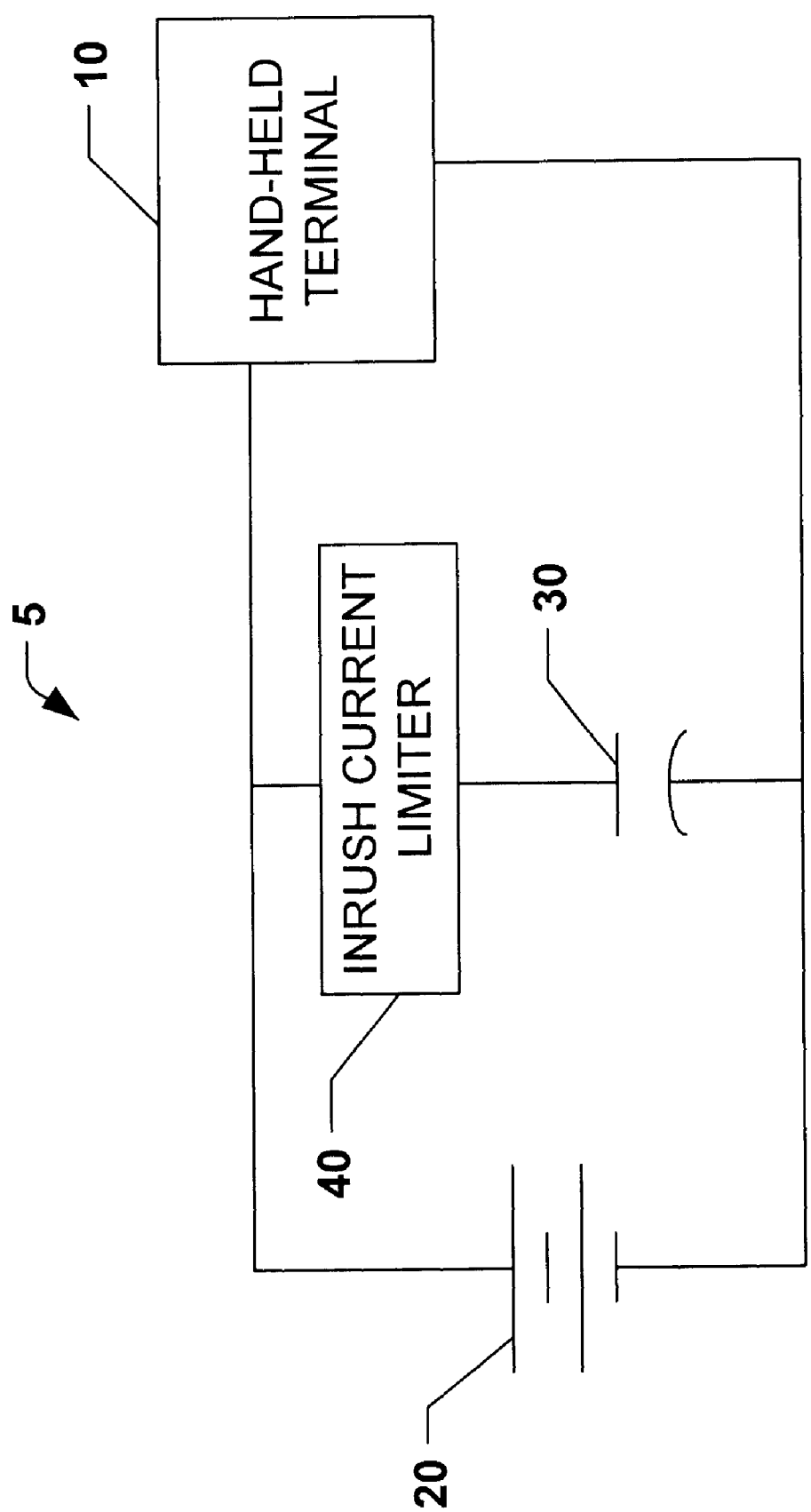
FIG. 1 is a schematic block diagram of a power management system for a portable electronic device in accordance with one aspect of the present invention.

The present invention will now be described with reference to the drawings, wherein like reference numerals are used to refer to like elements throughout.

Referring initially to FIG. 1, a schematic block diagram of a power management system 5 for a portable electronic device is provided in accordance with one aspect of the present invention. In this example, the portable electronic device is a hand-held terminal 10 used in a wireless communication network for tracking inventory, storing data, etc. A battery 20 is coupled to the hand-held terminal 10 and is employed to provide power to the hand-held terminal 10. The battery 20 is typically a rechargeable Lithium-Ion battery. However, it is to be appreciated that the battery 20 may be of any type (e.g., Nickel-Cadmium, Nickel-Metal-Hydride, Alkaline, Lithium Polymer), depending upon the application at hand. If the battery 20 ceases to provide power to the hand-held terminal 10, a super capacitor 30 is employed as a supplemental power source to avoid information loss in the hand-held terminal 10. The super capacitor 30 and the battery 20 are connected electrically in parallel. The battery 20 may cease to provide power in a number of different situations; for example, the battery 20 may become disconnected if the terminal 10 is dropped, when the battery 20 is being replaced with a new battery, or if the battery 20 fails. However, it is to be appreciated that the super capacitor 30 is also employed by the system in normal operating conditions of the hand-held terminal 10, as will be described in further detail below. An inrush current limiter 40 can also be included in the system to protect the battery from a high peak surge or inrush currents caused by a fully depleted supercap.

Figure 2:
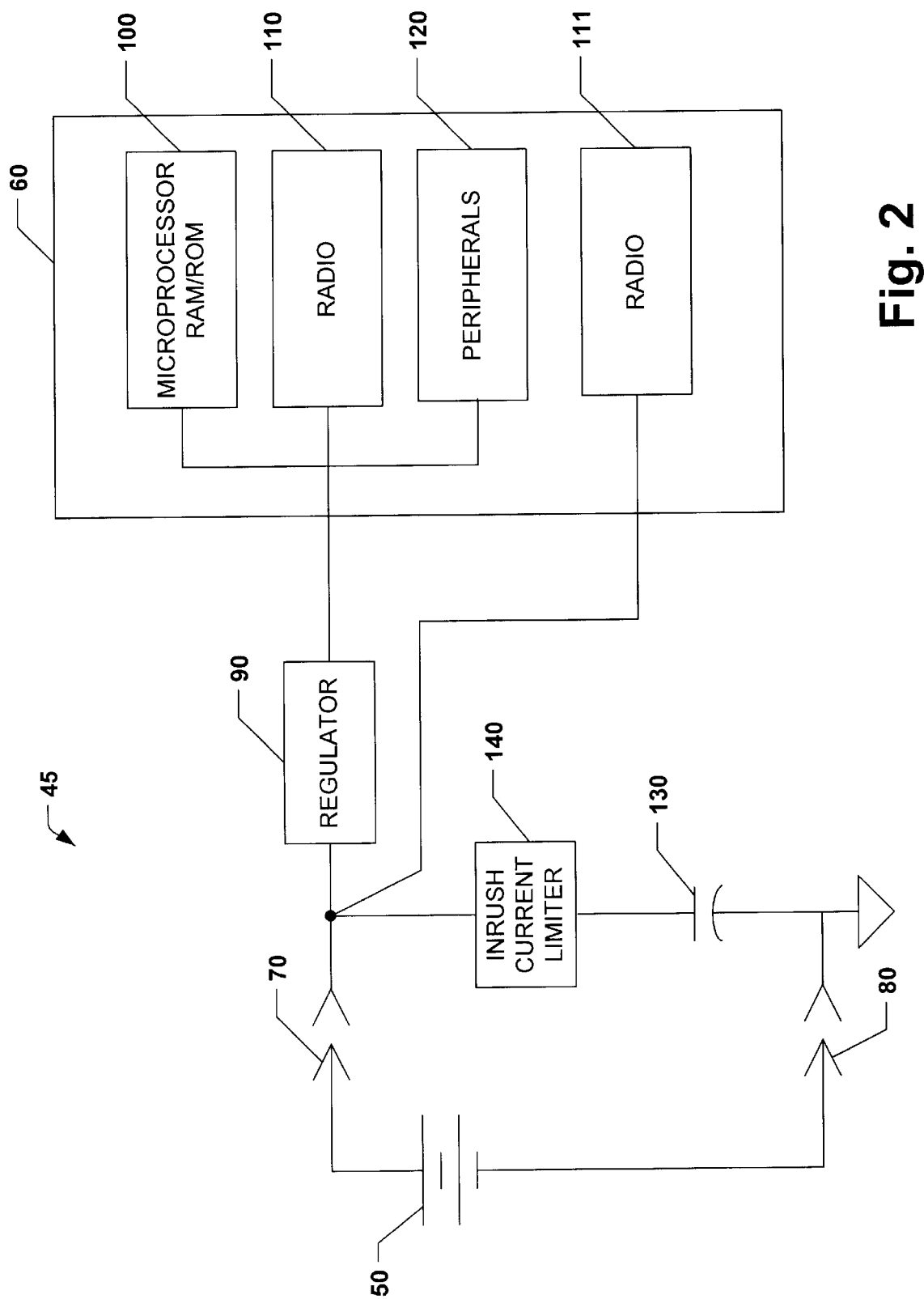
FIG. 2 is a schematic block diagram of a power management system for a portable electronic device in accordance with one aspect of the present invention.

In FIG. 2, a schematic block diagram of a hand-held mobile terminal 45, which includes a power management system, is shown in accordance with another aspect of the present invention. A battery 50 is connected to a hand-held mobile terminal 45 via battery contacts 70 and 80. The battery 50 includes electrical contacts designed to correspond to the battery contacts 70 and 80 of the hand-held terminal 45. The contacts are employed to provide power from the battery 50 to the terminal 45. Preferably, the contacts of the battery 50 and the hand-held terminal 45 are made of a highly conductive metal that is resistant to corrosion, such as, for example, Nickel Plated Beryllium Copper. When the electrical contacts of the battery 50 are connected to the battery contacts 70 and 80 of the hand-held terminal 45, power is provided to a regulator 90 of the hand-held terminal 45. The regulator 90, in turn, provides power to hand-held terminal load components 60. The terminal load components 60 include, but are not limited to, a microprocessor 100, Random Access Memory (RAM) and Read Only Memory (ROM), a radio 110, which receives power through the regulator, a radio 111, which receives power directly from the battery 50 and/or super capacitor 130 and peripherals 120. Radio 111 is connected directly to the battery 50 and/or super capacitor 130 instead of through the regulator 90 because it requires more power than the regulator 90 can provide. Radio 111 may receive and transmit through a LAN, GSM, CDPD, GPRS, PAN,or CDMA, for example. If the battery 50 loses connection with the battery contacts 70 and 80, the battery 50 will cease to provide energy to the regulator 90. Therefore, supplemental power for the mobile terminal 45 is needed to avoid information loss.

The hand-held mobile terminal 45, thus, includes a super capacitor 130 connected in parallel with the battery 50. The large capacitance of super capacitors permits the storage of relatively large amounts of energy. Thus, the stored energy in the super capacitor 130 can be used to power the hand-held terminal load components 60 for a short period of time when the battery 50 is not connected to the terminal 45, or otherwise ceases to provide energy to the terminal 45. Super capacitors are typically high surface area carbon capacitors and similar high-energy storage devices. They are able to hold a very high charge, which can be released very quickly or rather, more slowly, depending upon the situation needed. Batteries, generally, have limited capabilities to deliver power and traditional capacitors have limited capabilities to store energy, while super capacitors are able to combine some of the energy storage capabilities of batteries and power discharge characteristics of capacitors. The operating principle of a super capacitor is based on an electric double layer positioned at the interface between activated carbon particles and sulfuric acid solution as electrolyte. An ionically conducting but electrically insulating porous membrane separates the two electrodes. Charge is electrostatically stored in the electrochemical double-layer formed on the carbon surface of the super capacitor. Conductive rubber membranes contain the electrode and electrolyte material and make contact to the cell.

One instance in which the battery 50 can lose connection with the battery contacts 70 and 80 is if the hand-held terminal 45 is dropped. The drop of the hand-held terminal 45 does not affect the super capacitor 130 as it is securely attached to the regulator 90 electronics. Since the super capacitor 130 is connected directly to the regulator 90, the super capacitor 130 expends its stored energy to maintain power to the regulator 90 and the terminal architecture of the hand-held terminal 45 until the battery 50 reconnects with the battery contacts 70 and 80. It is to be appreciated that the super capacitor 130 can be used as a supplemental power source in any situation in which the battery 50 becomes disconnected with the hand-held terminal 45, or otherwise fails to provide a suitable level of power to the terminal 45.

Thus, the hand-held terminal 45 may utilize the super capacitor 130 as the main source of power for a short period of time. High initial currents can result due to super capacitor impedance when large voltage differences are between the capacitor and battery are present. These large super capacitors act like a short circuit, producing an immediate inrush surge current with a fast rise time. The peak inrush current is several orders of magnitude greater than the circuit's steady state current. This power surge can lead to the activation of a battery protection circuit if the battery fails and/or can seriously damage other components or lead to blown fuses or tripped breakers. Thus, an inrush current limiter 140 is connected in series with the super capacitor 130. Inrush current limiter 140 is designed to limit the inrush level to the capacitor without a current limit on the output from the capacitor. Inrush current.limiter 140 may be a NTC (Negative Temperature Coefficient) thermistor or an active circuit. However, any appropriate inrush current suppression technique may be employed depending upon the application, the type of battery employed, the equipment's power level, and the frequency at which the equipment is likely to be exposed to inrush currents.

In addition to acting as a supplemental power source for the battery 50, the super capacitor 130 shares a common load with the battery 50, which extends the operating time of a hand-held terminal. The super capacitor 130 and the battery 50 are connected electrically in parallel to drive the load. Furthermore, the system is able to distribute the demands placed upon the super capacitor 130 and the battery 50 in accordance with their individual capacity and/or power capabilities. The present invention also aids to tap more of the available capacity of the battery between recharges.

Figure 3:
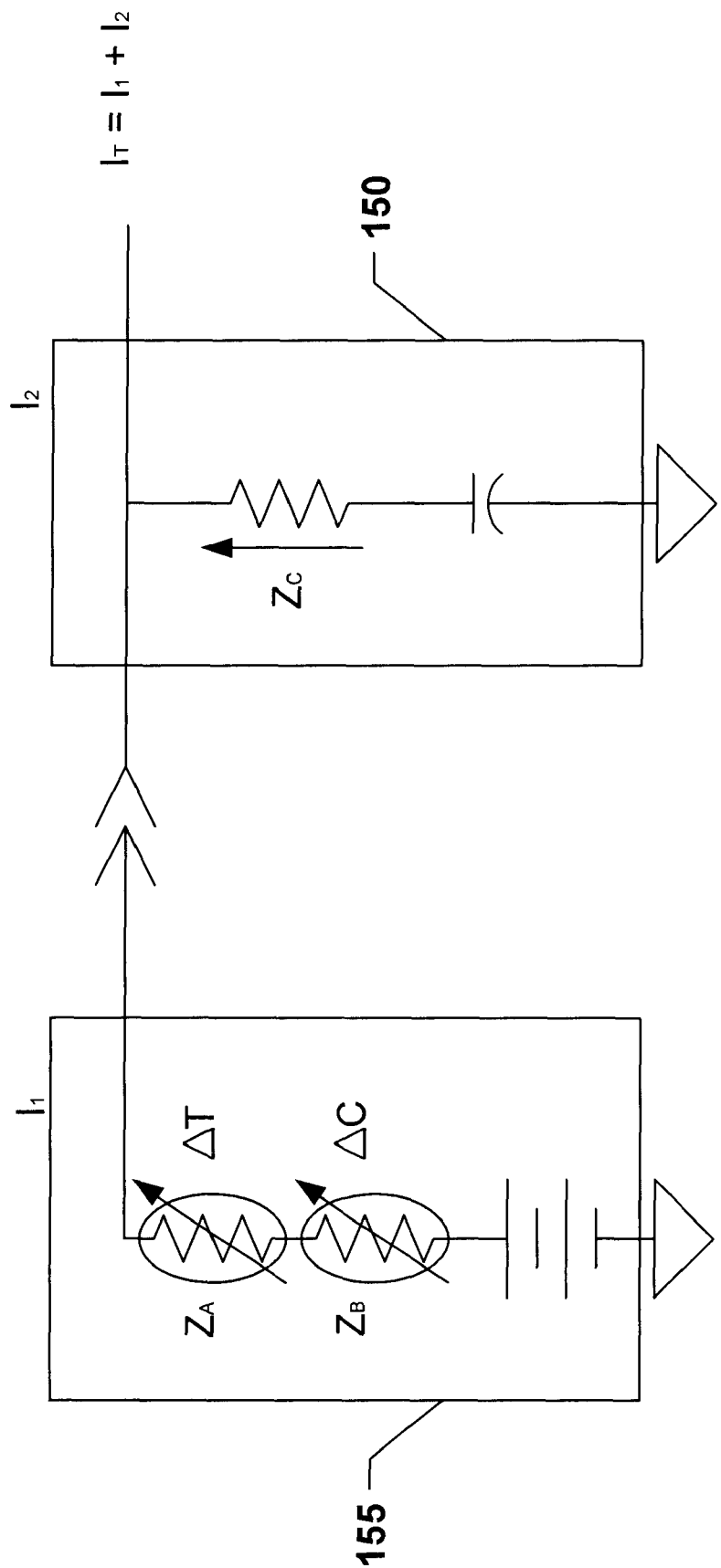
FIG. 3 is a schematic block diagram of a power management system for a portable electronic device in accordance with one aspect of the present invention.

Turning now to FIG. 3, the stored energy in a super capacitor 150 can be used during high power demand periods to provide compensation for the internal impedance of a battery 155 and the path impedance between the battery 155 and the load. The internal resistance of current battery technology varies with temperature and percent charge. In the battery 155, the change in impedance due to a change in temperature is represented by $Z_A$; and the change in impedance due to a change in charge is represented by $Z_B$. For example, as temperature drops, the impedance in the battery rises. This temperature drop combined with a large power demand from the hand-held terminal 45 can result in a voltage drop out of the battery 155. Thus, the super capacitor 150 is connected electrically in parallel with the battery 155 to compensate for the rise in the battery's impedance. The super capacitor 150 has lower internal impedance, represented by $Z_C$, and more stable internal impedance over temperature than the battery 155. Thus, at cold temperatures, when the internal impedance of the battery 155 rises, the significantly lower internal impedance of the super capacitor 150 is able to provide compensation for the high internal impedance of the battery 155, thereby preventing a regulator to prematurely drop out. Similarly, the internal impedance of the super capacitor 150 compensates the internal impedance of the battery 155 for a change in charge in the battery 155 or a combination of a change in temperature and a change in charge in the battery 155. The present invention also enables the power supply to operate in its peak efficiency range.

Figure 4:
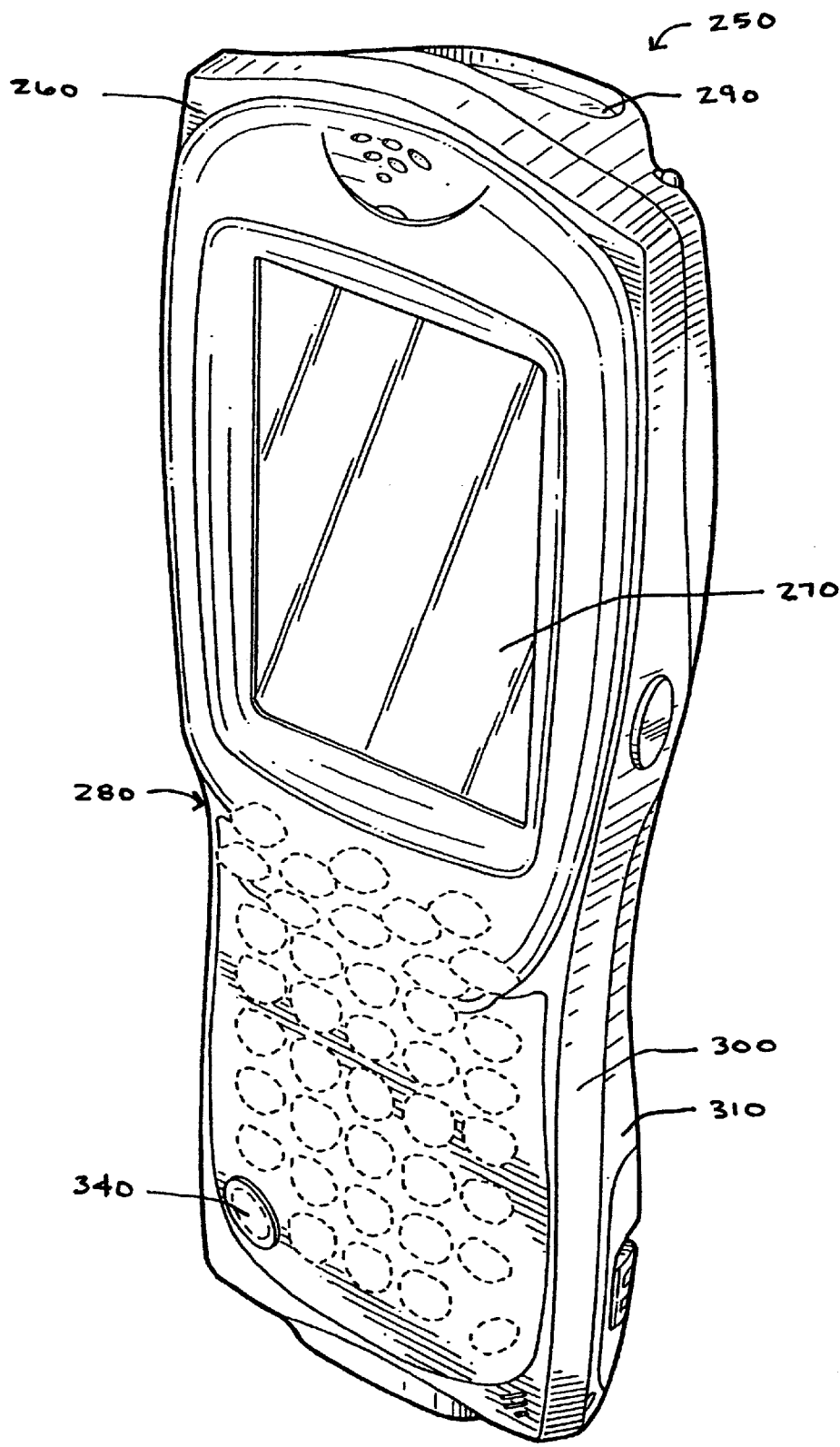
FIG. 4 is a perspective front view of a portable electronic device in accordance with one aspect of the present invention.
Figure 5:
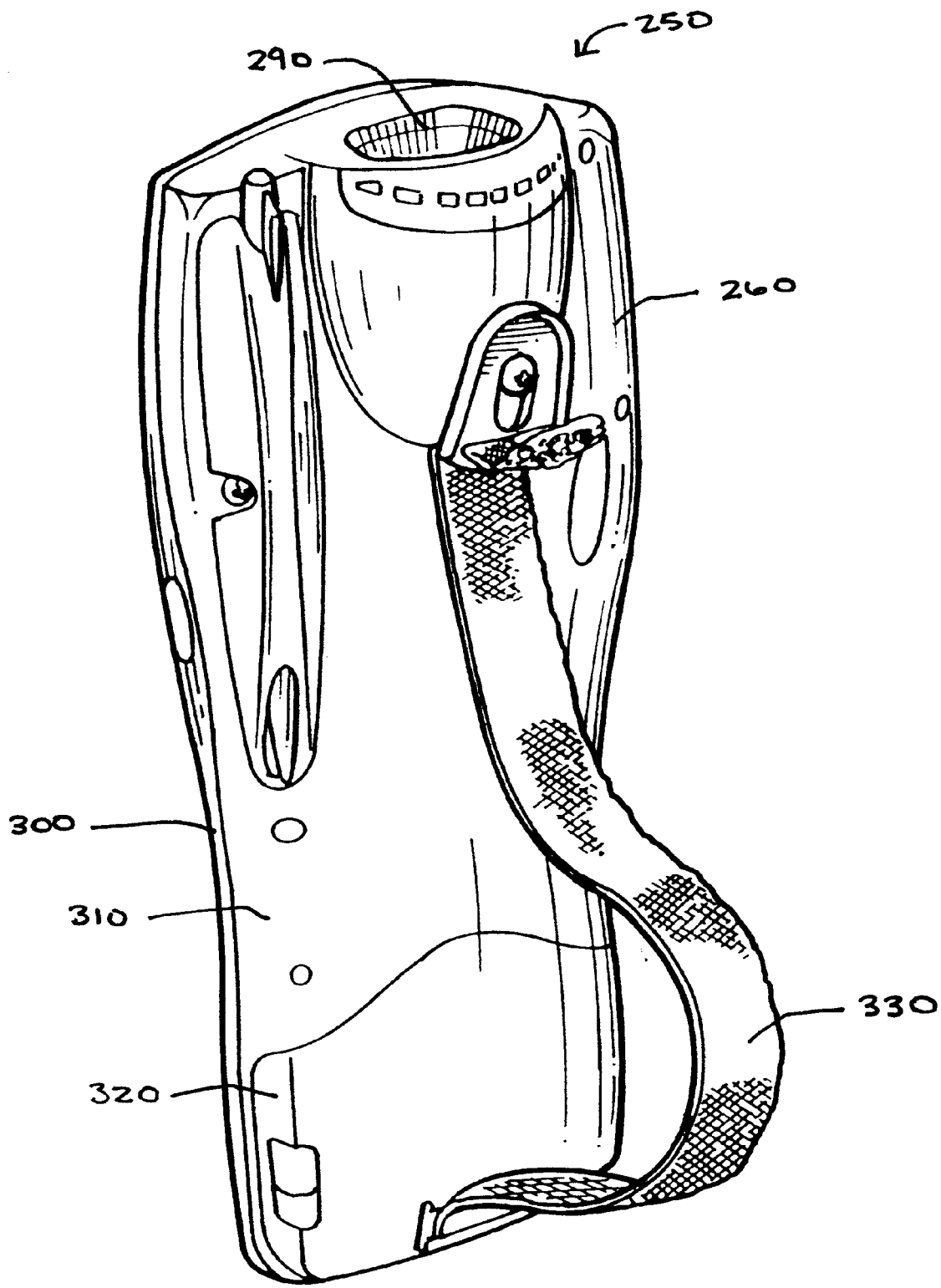
FIG. 5 is a perspective back view of a portable electronic device in accordance with one aspect of the present invention.

Turning now to FIGS. 4 and 5, pictorial representations of front and back views, respectively, of a portable electronic device are shown. In this example, the portable electronic device is a hand-held terminal 250 used in a wireless communication network for tracking inventory, storing data, etc. The user may input and/or process data via a keypad, bar code scanner, imager, etc. independent of the hand-held terminal 250 being connected to a LAN or WAN, for example. When the hand-held terminal 250 does not include a radio to provide for real time communications of data to a LAN or WAN, the data is stored in memory within the hand-held terminal 250. In such circumstances, when the hand-held terminal 250 is eventually connected to a LAN or WAN, the data can be transmitted to a host computer (not shown). It will be appreciated that the portable device could also be any other device that is portable in nature and having electronic circuitry therein in accordance with the present invention. For example, the portable device could be a laptop computer or notebook computer, a PDA, or even a cellular telephone or pager, which employs batteries.

The hand-held terminal 250 includes a housing 260, a touch screen 270 for displaying information to a user and allowing the user to input information and/or operational commands, a set of user interface keys 280 for allowing the user to input information and/or operational commands and a bar code reader 290. The bar code reader 290 is adapted to read information on a bar code label or the like. The hand-held terminal 250 can include a LED that is illuminated to reflect whether the bar code has been properly or improperly read. The described components 270, 280 and 290 are located in the housing 260 that is an elongated enclosure of a size and includes such contours as to conveniently fit into the open palm of the user. The housing 260 may be comprised of a number of shell portions such as for example front and rear shells 300 and 310 as well as a battery pack lid 320 (FIG. 5). The housing 260 may also include a hand strap 330 (FIG. 5) for user comfort. The user interface keys 280 may include a full alphanumeric keypad, function keys, enter keys, etc. The hand-held terminal 250 also includes a window through which a bar code reader 290 is able to read a bar code label presented to the hand-held terminal 250. Also included in the hand-held terminal 250 is an ON/OFF power key 340 for turning the device on and off.

Figure 6:
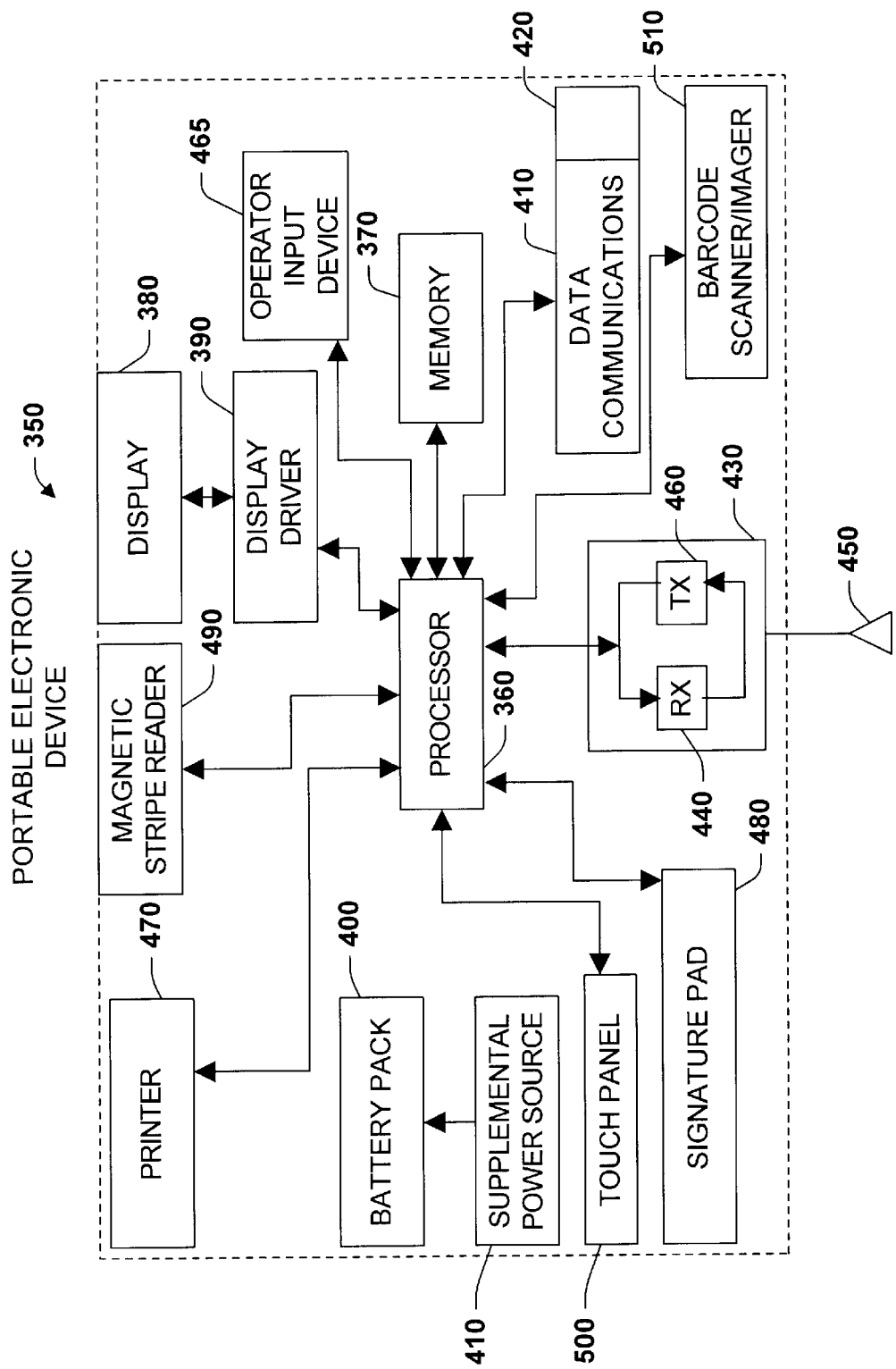
FIG. 6 is a schematic block diagram of a general operation of a portable electronic device in accordance with one aspect of the present invention.

Turning now to FIG. 6, a schematic representation according to one aspect of the present invention is shown in which a processor 360 is responsible for controlling the general operation of a portable electronic device 350. The processor 360 is programmed to control and operate the various components within the portable electronic device 350 in order to carry out the various functions described herein. The processor or CPU 360 can be any of a plurality of processors, such as the NEC 4121, NEC 4181, Intel 1110, Intel Pentium 50/75, Intel Pentium 60/90, and Intel Pentium 66/100, Intel Pentium PRO and Intel Pentium 2, and other similar and compatible processors or micro controllers. A processor such as Intel's 8 bit microcontrollers, the 8031, 8051 or 8052 can be utilized. The manner in which the processor 360 can be programmed to carry out the functions relating to the present invention will be readily apparent to those having ordinary skill in the art based on the description provided herein.

A memory 370 tied to the processor 360 is also included in the portable electronic device 350 and serves to store program code executed by the processor 360 for carrying out operating functions of the portable electronic device 350 as described herein. The memory 370 also serves as a storage medium for temporarily storing information such as receipt transaction information and the like. The memory 370 is adapted to store a complete set of the information to be displayed. According to a preferred embodiment, the memory 370 has sufficient capacity to store multiple sets of information, and the processor 360 could include a program for alternating or cycling between various sets of display information.

A display 380 is coupled to the processor 360 via a display driver system 390. The display 380 may be a liquid crystal display (LCD) or the like. The display 380 is operable to display data or other information relating to ordinary operation of the portable electronic device 350. For example, the display 380 may display a set of customer information, which is displayed to the operator and may be transmitted over a system backbone (not shown). Additionally, the display 380 may display a variety of functions that control the execution of the portable electronic device 350. The display 380 is capable of displaying both alphanumeric and graphical characters. Furthermore, the display 380 may be a touch screen, able to receive user information as well as display information.

Power is provided to the processor 360 and other components forming the portable electronic device 350 by a battery pack 400. In the event that the battery pack 400 fails or becomes disconnected from the portable electronic device 350, a supplemental power source 410 provides power to the processor 360, the supplemental power source 410 being a super capacitor connected electrically in parallel with the battery pack 400. The hand-held terminal 350 may enter a minimum current draw of sleep mode upon detection of a battery failure.

The portable electronic device 350 includes a communication subsystem 410 that includes a data communication port 420, which is employed to interface the processor 360 with the main computer. The portable electronic device 350 also optionally includes an RF section 430 connected to the processor 360. The RF section 430 includes an RF receiver 440, which receives RF transmissions from the main computer for example via an antenna 450 and demodulates the signal to obtain digital information modulated therein. The RF section 430 also includes an RF transmitter 460 for transmitting information to the main computer, for example, in response to an operator input at keypad 465 or the completion of a transaction. Peripheral devices, such as a printer 470, signature pad 480, magnetic stripe reader 490, touch panel 500, and barcode scanner 510 can also be coupled to the portable electronic device 350 through the processor 360.

It will be appreciated that the scope of the present invention is intended to include any portable electronic device and the type of battery it is employing. A super capacitor applies an appropriate level of power to the portable electronic device so that the device may operate while the battery is not connected to the battery contacts.

Although the invention has been shown and described with respect to a certain preferred aspect or aspects, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary aspect or aspects of the invention. In addition, while a particular feature of the invention may have been described above with respect to only one of several aspects, such feature may be combined with one or more other features of the other aspects, as may be desired and advantageous for any given or particular application. Furthermore, to the extent that the term "includes" is used in either the detailed description or the claims, such term is intended to be inclusive in a manner similar to the term "comprising".

What is claimed is:

1. A system for providing a supplemental power supply to a portable electronic device, comprising:
    a battery connected to a portable electronic device through battery contacts;
    a device power supply, the device power supply being supplied power by the battery;
    a super capacitor employed to provide power to the device power supply when the battery loses connection with the battery contacts; and
    an inrush current limiter electrically connected to the super capacitor.

2. The system of claim 1, the super capacitor being connected electrically in parallel with the battery.

3. The system of claim 1, the inrush current limiter being connected electrically in series with the super capacitor.

4. The system of claim 1, the device power supply providing power to load components of the portable electronic device.

5. The system of claim 4, the portable electronic device load components including a microprocessor, a radio, and peripherals.

6. The system of claim 1, the battery being rechargeable.

7. The system of claim 6, the battery being a lithium-ion battery.

8. The system of claim 6, the battery being a nickel-cadmium battery.

9. The system of claim 6, the battery being a nickel-metal-hydride battery.

10. A method for providing a supplemental power supply to a portable electronic device, comprising:
    providing a battery to a portable electronic device, the battery providing power to the portable electronic device through battery contacts;
    providing a super capacitor electrically in parallel with the battery;
    providing an inrush current limiter electrically in series with the super capacitor; and
    employing the super capacitor to provide power to the portable electronic device when the battery loses connection with the battery contacts.

11. A method for providing impedance compensation for a battery in a portable electronic device, comprising:
    providing a battery to a portable electronic device, the battery providing power to the portable electronic device through battery contacts; and
    providing a super capacitor electrically in parallel with the battery, the super capacitor providing internal impedance compensation if an internal impedance of the battery rises to a predetermined level.

12. The method of claim 11, the super capacitor being further employed to provide power to the portable electronic device when the battery loses connection with the battery contacts.

13. A system for a hand-held mobile terminal comprising:
    a battery;
    a super capacitor electrically connected in parallel with the battery, the super capacitor being operable to share a common load with the battery.

14. The system of claim 13, the system being operable to distribute the demand placed on the battery and super capacitor in accordance with their respective capacity and power capabilities.

* * * * *